United States Patent Office 3,316,278

Patented Apr. 25, 1967

3,316,278

4-NITRAZA-1,2-EPOXYALKANES

Gustave B. Linden, Short Hills, N.J., and Ralph E. Meyer and Clinton R. Vanneman, Sacramento, Calif., assignors to Aerojet-General Corporation, Azusa, Calif., a corporation of Ohio

No Drawing. Filed June 2, 1964, Ser. No. 372,122
2 Claims. (Cl. 260—348)

This invention pertains to a group of novel epoxy compounds containing in the molecular structure one or more nitro groups, and to their method of synthesis.

Nitro-containing diols have been used in the preparation of binders for solid rocket propellants. While these known binders do possess a fairly high specific impulse, their mechanical and chemical properties still leave room for considerable improvement. In the commercial polyurethane field, it is known that the use of polyalkylene ether polyols improves the properties of polymers produced from them. The polyurethanes from polyalkylene ether polyols are disclosed in U.S. Patent No. 2,948,691, issued Aug. 9, 1960. However, the advantages resultant from polyether linkages in the polyurethane chain have not heretofore been available in the high energy polymer binder field because of the lack of a suitable monomer from which could be obtained high-molecular weight, nitro-containing polyalkylene ether polyols. According to our invention, there now has been discovered several classes of nitro-containing epoxy compounds which are capable of polymerization to the corresponding polyalkylene ether polyols and then to polyurethane propellant binders. These new compounds enable propellant chemists to prepare propellant binders which are characterized by the benefits associated with the presence of a multiplicity of ether linkages along the polymer chain, and at the same time retain the energy and oxidizing power of nitro groups.

It is, therefore, an object of this invention to prepare a novel class of nitro-containing epoxy compounds capable of undergoing polymerization to high molecular weight polyalkylene ether diols containing many nitro groups.

Another object of our invention is to prepare these new epoxy compounds in a manner whereby they are obtained in the high purity required to meet the exacting standards demanded by the reliability requirements which exist in the solid propellant art.

These objects, as well as others, will be evident from the more specific description of our invention which follows.

The novel epoxy compounds of this invention are those having the following generic formula:

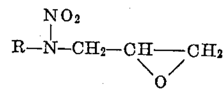

wherein R is lower alkyl of from 1 to about 6 carbons. In the foregoing formula, R is most preferably methyl or ethyl.

Preferred species of the compounds of this invention are:

4-nitraza-1,2-epoxypentane
4-nitraza-1,2-epoxyhexane
4-nitraza-1,2-epoxyoctane
4-nitraza-1,2-epoxydecane
4-nitraza-1,2-epoxydodecane The novel compounds of our invention result from the reaction shown in the following equation:

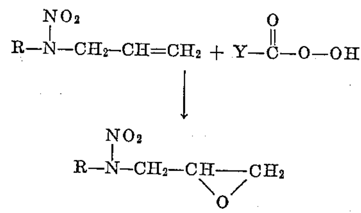

wherein R is as defined previously, and Y is a monovalent aromatic or aliphatic organic radical such as phenyl, trifluoromethyl, methyl, etc.

The above reaction is preferably, although not necessarily carried out in the presence of a halohydrocarbon solvent such as methyl chloride, methylene dichloride or methyl bromide. In this reaction, proportions are not critical, but best results are obtained when the per-acid is used in a slight stoichiometric excess over the amount of the olefin reactant. The reaction temperature usually is within the range from about 0° C. to about 150° C. Common buffers, such as sodium carbonate, disodium acid phosphate and sodium bicarbonate are preferably employed in the reaction mixture and their presence is found to result in higher product yields.

The following two examples illustrate the preparation of the compounds of this invention.

EXAMPLE I

*4-nitraza-1,2-epoxypentane*

Twenty-nine grams (0.25 mole) 4-nitraza-1-pentene was added to a solution of 38 grams (0.275 mole) perbenzoic acid in chloroform (.06693 gram/ml.), and the resulting solution was stored overnight in a refrigerator. After 18 hours, only 13.5 percent of the theoretical amount of perbenzoic acid had been consumed, and the solution was stored at ambient temperature in the dark for the remaining reaction period. At the higher temperature, the rate of epoxidation was increased, but the increased rate of decomposition of the perbenzoic acid was more pronounced. After 47 hours, 37.5 percent of the theoretical amount of perbenzoic acid was consumed. Sufficient perbenzoic acid was added at this time to give a 106 mole percent excess of this reagent over the remaining quantity of the olefin, and the reaction was continued for a total period of 136 hours. The solution was treated with sodium carbonate solution until the chloroform solution failed to give a test for perbenzoic acid, washed with water, and dried over anhydrous calcium sulfate. Distillation of the solvent at reduced pressure gave 27.9 grams residue, $n_D^{25}$ 1.5046. On prolonged storage in the cold, this liquid deposited 1.3 grams crystals which were purified by recrystallization from methanol and shown to be benzoylperoxide, apparently carried through from the preparation of perbenzoic acid. The filtrate was transferred to a small Claisen flask and distilled at reduced pressure.

Cut 1: B.P. 63° C./10μ; 4.1 grams; $n_D^{25}$ 1.4880
Cut 2: B.P. 63.5° C./8–10μ; 11.8; $n_D^{25}$ 1.4868
Cut 3: B.P. 63.5–67° C./8μ; 1.7 grams
Residue: 7.4 grams The residue set to a glass on cooling to room temperature and was the hydroxybenzoate resulting from the ring opening of the epoxide. The first two fractions corresponded to a 60.2 percent yield of crude 4-nitraza-1,2-epoxypentane. These fractions were combined and redistilled.

Cut 1: B.P. 53–57° C./3–4μ; 1.9 grams; $n_D^{25}$ 1.4876
Cut 2: B.P. 53–57° C./3–4μ; 9.1 grams; $n_D^{25}$ 1.4870
Cut 3: B.P. 53–57° C./4μ; 2.3 grams; $n_D^{25}$ 1.4867

The infrared spectrum of the second fraction (3.45 (w), 5.85 (w), 6.60 (s), 6.80 (m), 6.90 (m), 7.10 (m), 7.50 (s), 7.75 (vs), 9.85 (m), 10.40 (m), 10.65 (m), 10.95 (w), 11.70 (m), 12.00 (w), 13.10 (m), 15.10 (w)) indicated the desired epoxide with no hydroxyl contamination. A sample of this material was submitted for microanalysis.

*Analysis.*—Calc'd for $C_4H_8N_2O_3$: percent C, 36.36; percent H, 6.10; percent N, 21.21. Found: percent C, 37.22; percent H, 6.12; percent N, 21.13.

EXAMPLE II

*4-nitraza-1,2-epoxypentane*

Peroxytrifluoroacetic acid was prepared by the addition of 42.3 ml. (0.3 mole) trifluoroacetic anhydride to a stirred suspension of 7 ml. (0.25 mole) 90 percent hydrogen peroxide in 50 ml. dry methylene chloride, with ice-bath cooling during a 10 minute period. The reaction solution was stirred in the cold for an additional 15 minutes, transferred to a separatory funnel, and added to a vigorously agitated mixture of 24.4 grams (0.21 mole) 4-nitraza-1-pentene, 95.4 grams (0.9 mole) powdered sodium carbonate, and 200 ml. methylene chloride during a 35 minute period. The mixture was held at 30–35° C. by external cooling during this addition, and was then heated at reflux temperature with continued stirring for 30 minutes. Ice water (500 ml.) was added, and the mixture was allowed to stir until dissolution of the inorganic salts. The two-phase mixture was separated, and the aqueous phase was extracted four times with 50 ml. portions of methylene chloride. The combined organic phases were dried over anhydrous calcium sulfate, and the solvent was distilled at diminished pressure. The reduced pressure distillation of the residue from a Claisen flask did not give an efficient separation of product and starting material (total distillate, 20.4 grams $n_D^{25}$ 1.4724 to 1.4811; residue 1.3 grams $n_D^{25}$ 1.4884), and the distillate was fractionated using a Holzman column.

Cut 1: B.P. 56–58° C./2 mm.; 4.9 grams; $n_D^{25}$ 1.4745
Cut 2: B.P. 56–96° C./2 mm.; 2.8 grams; $n_D^{25}$ 1.4747
Cut 3: B.P. 96° C./2 mm.; 9.7 grams; $n_D^{25}$ 1.4832
Residue: 1.4 grams; $n_D^{25}$ 1.4832

The first two fractions represent a 31.6 percent recovery of 4-nitraza-1-pentene and the third cut corresponds to a 35 percent yield of 4-nitraza-1,2-epoxypentane.

As can be seen from these examples, the reactions of our invention are generally carried out at atmospheric pressure. The products are isolated in conventional manner by distillation, evaporation, crystallization and/or extraction.

The nitro-containing epoxy compounds of this invention are converted to high molecular weight polyether diols by polymerization at room temperature or at elevated temperature in the presence of water or ethylene glycol. The resultant diols have a molecular weight of from 1,000 to about 10,000, and are readily polymerizable with polyisocyanates, such as toluene diisocyanate or 3-nitraza-1,5-pentane diisocyanate, to yield polyurethane polymers. These polyurethane polymers are of high specific impulse, and provide solid rocket propellants of improved mechanical and chemical properties. Thus, as is indicated above, the epoxy compounds of this invention enable those skilled in the art to prepare a new class of improved solid propellants.

The epoxy compounds of this invention, which contain one or more nitro groups, are also inherently useful as high explosives. In addition, these compounds can be used in any conventional explosive missile, projectile, rocket, or the like, as the main explosive charge. An example of such a missile is described in U.S. Patent 2,470,162, issued May 17, 1949. One way of using such high explosives in a device such as that disclosed in U.S. Patent 2,470,162 is to absorb the liquid explosive in an absorbent material such as cellulose, wood pulp, or sawdust. The resultant dynamite-type explosive can then be packed into the warhead of the missile. A charge thus prepared is sufficiently insensitive to withstand the shock entailed in the ejection of a shell from a gun barrel or a rocket launching tube under the pressure developed from ignition of a propellant charge, and can be caused to explode on operation of an impact or time-fuse mechanism firing a detonating explosive such as lead azide or mercury fulminate.

Having fully described the invention, it is intended that it be limited only by the lawful scope of the appended claims.

We claim:

1. The compound 4-nitraza-1,2-epoxypentane.

2. A compound of the formula

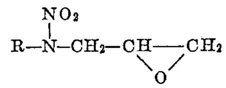

wherein R is lower alkyl.

References Cited by the Examiner

Elderfield, Heterocyclic Compounds, vol. I, pp. 3–4 (1950).

Houben-Weyl, Methoden der Organischen Chemie, pp. 481–482 (1963).

WALTER A. MODANCE, *Primary Examiner.*

CARL D. QUARFORTH, REUBEN EPSTEIN, L. DEWAYNE RUTLEDGE, *Examiners.*

NORMA S. MILESTONE, L. A. SEBASTIAN, *Assistant Examiners.*